April 12, 1966  W. L. RAMER  3,245,462
HEAVY DUTY GRIDDLE TOP
Filed Aug. 1, 1963

INVENTOR.
William L. Ramer
BY
ATTORNEYS

April 12, 1966 W. L. RAMER 3,245,462
HEAVY DUTY GRIDDLE TOP
Filed Aug. 1, 1963 3 Sheets-Sheet 2

INVENTOR.
William L. Ramer
BY
ATTORNEYS

April 12, 1966  W. L. RAMER  3,245,462
HEAVY DUTY GRIDDLE TOP
Filed Aug. 1, 1963  3 Sheets-Sheet 3

INVENTOR.
William L. Ramer
BY
ATTORNEYS

# United States Patent Office 3,245,462
Patented Apr. 12, 1966

3,245,462
HEAVY DUTY GRIDDLE TOP
William L. Ramer, Lakewood, Colo., assignor to Speedster, Inc., Golden, Colo., a corporation of Colorado
Filed Aug. 1, 1963, Ser. No. 299,231
4 Claims. (Cl. 165—39)

This invention relates to cooking equipment and more particularly to heavy duty griddle units and construction thereof.

Practically all kitchens which prepare food for commercial purposes, such as restaurants, cafes, and the like, utilize a griddle for a portion of the cooking. Such griddles are relatively large to accommodate the needs of the establishment. It is normal to maintain the griddle heated throughout the working period of the particular establishment. Thus, if an establishment is open 24 hours a day, the griddle is maintained at about cooking temperature for 24 hours, since there is normally not sufficient time to heat the griddle and cook the food on individual order. Such griddles must, therefore, be able to withstand long periods of heating, and in some instances frequent cooling and heating.

Common construction for commercial griddles includes either a cast iron plate griddle top or heavy boiler plate as the griddle top. Fabrication of griddles from the cast iron or boiler plate is difficult and expensive. Such units are heavy, making disassembly and cleaning a major operation. Cleaning must be done frequently for sanitation, as splattered grease, drippings, etc. go rancid very rapidly and generally create germ traps.

The griddles may be heated in a variety of ways, and most commonly by gas or electricity. In many instances electrically heated griddles are the ones of choice, since they may be readily and uniformly regulated by means of thermostats. However, it is difficult to produce even heating on such iron griddles, particularly when the heating element is a tubular heating element wound through a sinuous path beneath the griddle top. Iron is not a high conductor of heat; therefore, cast iron or thick boiler plate griddle tops generally have hot spots. Thin gauge iron plate warps under such conditions.

According to the present invention, I have provided a griddle of thin gauge plate which is arranged for minimum, non-objectionable warping, and which provides uniform heating throughout the top of the griddle. In one embodiment of my invention, an aluminum plate is pulled tight against the thin gauge iron top, and by securing the heating element firmly against the aluminum plate heating from spaced electrical heaters produces uniform heating throughout the griddle top. Furthermore, a thermostat mounted centrally of the griddle and adjacent the aluminum plate provides positive control of the temperature of the griddle. The griddle is provided with a sandblasted finish which becomes a non-sticking surface when heated with grease and carbon from the food or grease.

Included among the objects and advantages of the present invention is a commercial griddle of light construction having uniform heating characteristics under heavy usage. The device of the invention is readily constructed by usual metal fabrication, being substantially less expensive than the common commercial griddles providing a device for long and heavy use without warping. The light construction of the present heavy duty griddle produces fast heating and cooling, and provides for easier and faster disassembly and cleaning of the unit.

These and other objects and advantages of the invention may be readily ascertained by referring to the following description and appended drawings in which.

Figure 1:
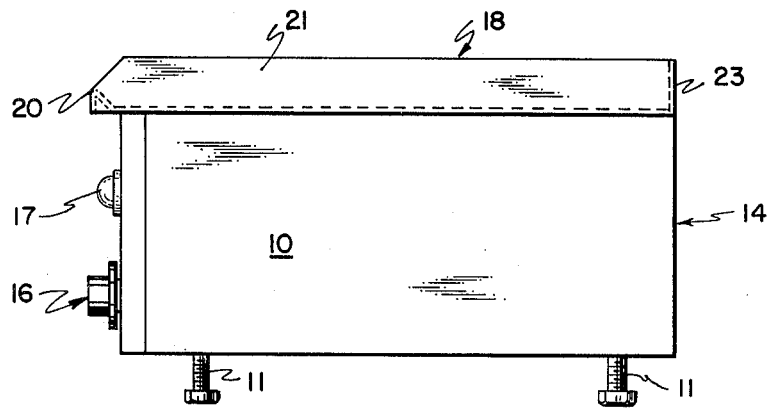
FIG. 1 is a side elevational view, partially schematic, of a completed grill ready for assembly in a counter top.

In the device shown in FIG. 1, a base cabinet 10, which may be of any desired material, but is preferably a hollow sheet metal cabinet having a recessed back 14, is provided with adjustable food bolts 11 arranged for leveling the same on a counter. A griddle top unit 18 includes a planar body of thin steel and has a rolled front lip 20, sides 21 and 22 and a back 23. The griddle top is preferably made of about 11 gauge, commercial cold rolled steel with the cooking top having a sandblasted finish, as explained in detail below. A sheet of proper size is notched at two corners and its side and back edges bent up to form the upright sides and back. The joints between the sides and back 24 and 25 are welded to provide a liquid-tight seal. Where the sides 21 and 22 join the rolled front lip 20, a weld is used to insure a liquid seal. The lip is provided with braces 26 welded in place to provide stiffening for the lip. In the finished welded form the device is essentially liquid-tight and is provided with a rim around the entire planar surface of the griddle. A grease drop hole 19 is provided near the back of the griddle for disposing of debris and excess grease from the griddle. The hole is cut so that metal from the sheet is bent downwardly to form a short spout. The cabinet is provided with a switch control 16 and a pilot light 17 which indicates operation of the heating elements of the device. Cabinets for such devices are common in the art, and they are generally set on a counter but they may be recessed, if desired, in the counter top so that the griddle is in effect at counter level. Also, such cabinets include a drop plan 15 for catching drippings from the hole 19.

Figure 2:
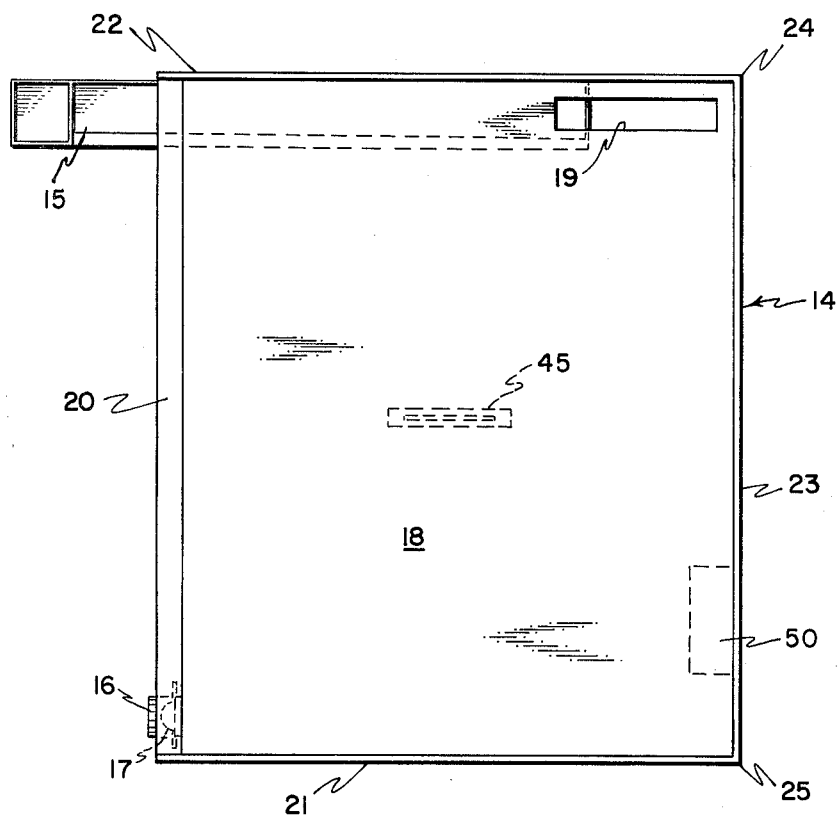
FIG. 2 is a top plan view of a griddle according to the invention.
Figure 3:
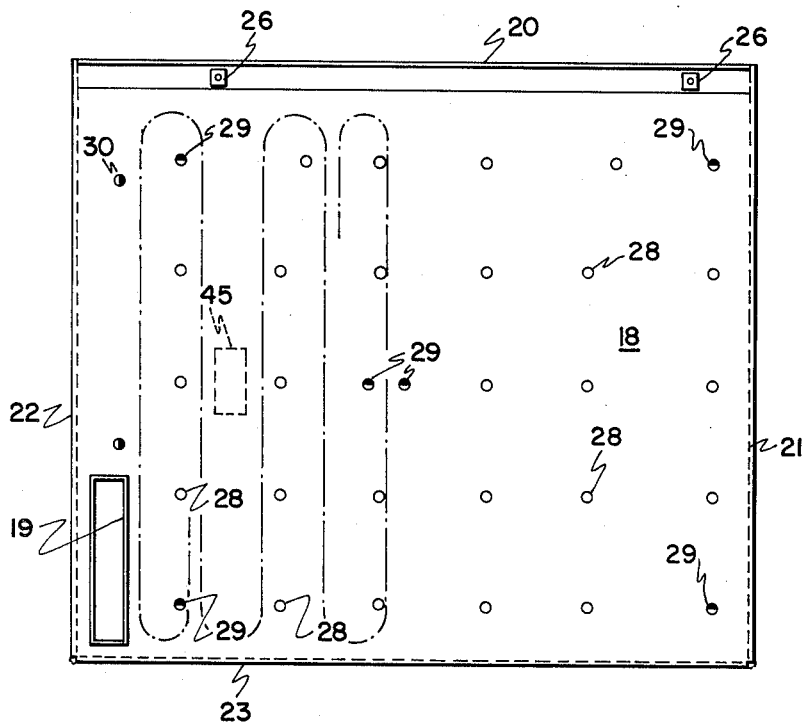
FIG. 3 is a bottom plan view of a griddle according to the invention, illustrating placement of an electric heating element, and studs for holding the element brackets.
Figure 4:
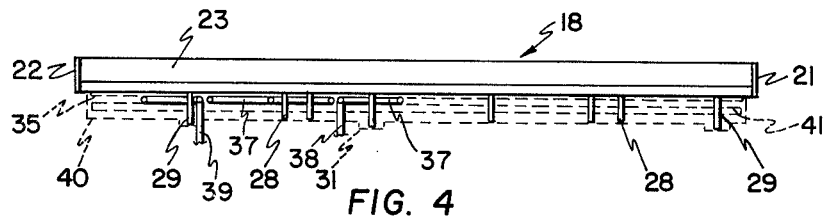
FIG. 4 is a side elevational view of the griddle top of FIG. 3, partially in dash lines for clarity, showing the overall assembly of the griddle top.
Figure 5:
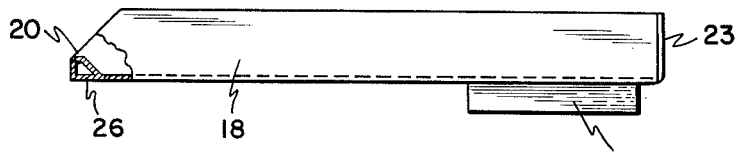
FIG. 5 is a cut-away view of a griddle top.
Figure 7:
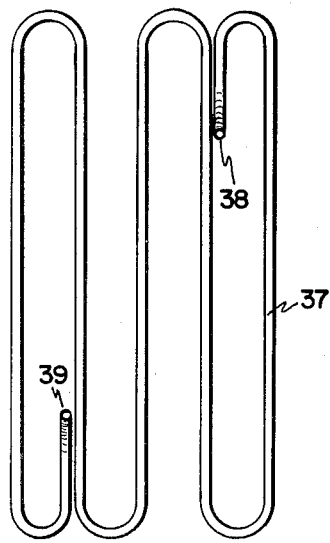
FIG. 7 is a top plan view of a heating element in proper configuration for assembly with a griddle top according to the invention.
Figure 8:
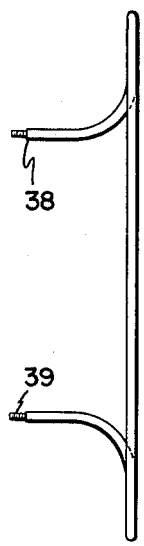
FIG. 8 is a side elevational view of the element of FIG. 7.
Figure 9:
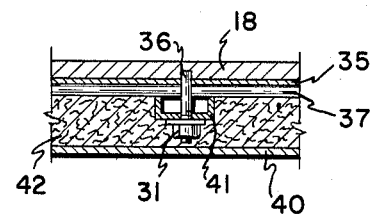
FIG. 9 is an enlarged detail of the construction of a griddle top according to the invention.
Figure 6:
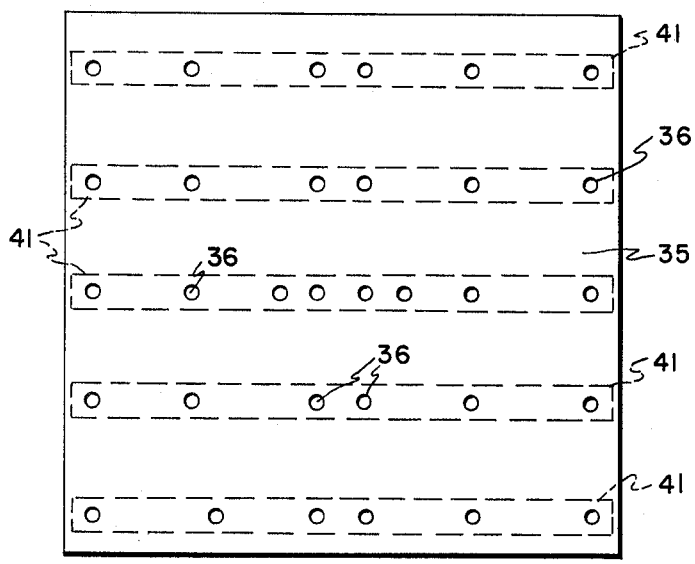
FIG. 6 is a top plan view of a reinforcing plate for use with a griddle top according to the invention.

The assembly of the griddle top is shown in FIGS. 3, 4 and 9. A plurality of threaded studs are fastened to the bottom of the plate 18 by welding or preferably by shooting the studs into the metal with a cartridge fired gun. The shot-in studs are permanently fixed to the plate with minimum labor. The studs as shown in FIG. 4 are of various lengths for different purposes, including short studs 28 and 30 and longer studs 29. The studs 28 are provided in six rows in one direction and five in the other on the back of the griddle plate. One longer threaded stud 29 is secured at each corner of the stud pattern and two in the center thereof for reception of nuts 31 which are threaded on each short stud to pull channels 37 tightly against the heating units and hold the assembly rigidly together and rigidly support the thin gauge plate griddle top. Several short studs 30 are placed along one edge for support of a track (not shown) which supports the drip pan 15. A 14-gauge aluminum plate 35 (FIG. 6) having a plurality of holes 36 bored therein to match all the studs on the griddle is initially placed over the studs to be in face engagement with the back of the griddle top. The aluminum plate is held tightly against the sheet metal griddle top by the heating elements, which are pulled tightly against the aluminum plate by the nuts bearing on the channels 41. When pulled tight the assembly provides good heat transfer to all portions of the steel plate and provides a rigid griddle top with a minimum of warping. The griddle is heated by two tubular electric elements 37 which are wound so as to be interlaced around the studs on each half of the griddle, and threaded contacts 38 and 39 for each coil are arranged to extend through a cover 40, which is shown in FIG. 4. The coils of the heating element are laced through the rows of studs. Only one coil is shown for clarity in FIG. 3; however, it is to be understood the other coil is placed on the unit around the studs on the right side of the griddle, FIG. 3. Insulation 42 is placed over the channels and around the longer studs. The cover plate 40, shown in dash lines in FIG. 4, is placed over the bottom of the assembly and nuts (not shown) are pulled up to form the assembly. Prior to placing the cover over the assembly, a thermostat control 45 (FIG. 2) is positioned essentially centrally of and adjacent the aluminum plate nested in the insulation.

A terminal block 50 is provided in the cabinet portion of the device for connecting the heating elements to a power source. The control switch 16 is interconnected with the power source and proper circuitry including the thermostat provides control. Such circuitry is known for various types of cooking units and detailed explanation is considered repetitious.

Commercial griddles are made in a variety of different sizes. However, a common size is in the range of about 18×20 inches. With such a size and with 11-gauge cold rolled steel, the device may be assembled in a rigid unit with minimum warping due to heating. Where larger grills are desired, the units may be placed side by side and held together by clips. Thus, if one unit burns out, it may be removed and the remaining one may continue in operation. Also, two complete circuits may be used for each griddle, so that each heating coil is provided with its individual thermostat control and switch.

The griddle top is sandblasted after the studs are affixed to the back (or bottom) of the griddle to provide a roughened surface. In such sandblasting the turned up edges and the front lip are also sandblasted. This roughened surface absorbs grease and carbon, and after heating for a short period produces a non-stick surface. This surface is completely different from the normal chrome plated, very smooth surface which scratches and cooking food sticks to the chrome. Scratching the griddle's sandblasted top does not destroy the non-stick qualities of the surface. Also, short periods of over-heating does not deteriorate the surface. The non-stick surface simplifies cooking and reduces the amount of grease normally used. It is, furthermore, less expensive to produce the improved surface as well as the construction of the unit itself.

While the invention has been illustrated with reference to a specific structure, there is no intent to limit the device to details so shown, except as defined in the following claims.

I claim:

1. A heavy duty griddle assembly comprising a planar body of relatively thin gauge commercial cold rolled steel having a narrow portion of its edges turned upright as a liquid barrier, a plurality of studs secured on the bottom surface of said body extending normally thereto and downwardly therefrom, said studs being arranged in sets and at least some of the peripheral ones being longer and all being threaded, an aluminum plate having perforations registering with said studs mounted thereover and in face contact with said body, at least one heating element interlaced around the studs, a plurality of channels mounted in parallel on said studs and each being continuous and extending from one side to the opposite side of said body and in contact with said heating element, a nut on each said stud pulling said channels down tightly on said element and rigidly supporting said planar body against warping, a cover over said aluminum plate, heating element and channels, a threaded nut mounted on said longer threaded studs and pulled down on said cover, thermostat means mounted centrally of the plate and in contact with said aluminum plate for controlling the heating elements of the assembly, and a base for said assembly.

2. A heavy duty griddle assembly comprising a planar body of thin gauge commercial cold rolled steel having its edges turned up as a liquid barrier, a plurality of studs secured in said body on the bottom thereof and extending normally and downwardly therefrom, said studs being arranged in at least two sets, selected peripheral studs being longer than the others and all being threaded, an aluminum plate mounted over said sets of said studs and in close face contact with said body, at least one heating element interlaced around the studs, a plurality of channels mounted in parallel on said studs and each being continuous and extending from one side to the other side of said planar body and in contact with said heating element, a nut threaded on each stud and pulled down tight to hold said element in place and maintain said planar body rigid against warping, a cover over said plate and heating element and channels, a nut threadedly mounted on said longer set of said threaded studs and pulled down on said cover, and a thermostat mounted centrally of the plate and in contact therewith for controlling the heating element of the assembly.

3. A griddle assembly according to claim 2 wherein said planar body is of 11-gauge cold rolled steel and approximately 18 by 20 inches.

4. A heavy duty griddle assembly comprising a planar main body portion of relatively light gauge commercial cold rolled steel not substantially larger than about 11 gauge, the side edges and back edge being bent up normal to said planar body and the intersecting corners thereof being welded together in liquid-tight arrangement, the front edge of said body portion being crimped forming a raised and rounded lip, a plurality of studs secured in the bottom of said body extending normally to the surface thereof, a selected portion of the peripheral studs being threaded for reception of the threaded nut, at least one aluminum plate having a plurality of holes therein mounted over said studs and positioned in face engagement against said body, a tubular heating element laced around said studs and positioned against said aluminum plate, a plurality of channel bracing members each being continuous and extending from one side to the other side of said body and mounted over said studs and bearing against said heating element, a plurality of nuts placed on said threaded studs and pulled down against said bracing member whereby to coincidentally pull down against said plate to hold the same against said body portion and thereby rigidly support said body against warping, a thermostat mounted centrally of the assembly for heat control, and a base for said assembly.

References Cited by the Examiner

UNITED STATES PATENTS

| | | | |
|---|---|---|---|
| 1,817,118 | 8/1931 | Adami | 219—476 |
| 2,259,143 | 10/1941 | Shroyer | 219—461 |
| 2,684,177 | 7/1954 | Kennedy | 220—64 |
| 3,010,006 | 11/1961 | Schwaneke | 219—438 |
| 3,078,006 | 2/1963 | Price et al. | 220—64 |
| 3,130,664 | 4/1964 | Jarmuth et al. | 219—463 |

RICHARD M. WOOD, *Primary Examiner.*

L. H. BENDER, *Assistant Examiner.*